US007315245B2

(12) United States Patent
Lynn et al.

(10) Patent No.: US 7,315,245 B2
(45) Date of Patent: Jan. 1, 2008

(54) SOAP DISPENSER BASE SYSTEM

(75) Inventors: John Morris Lynn, Austin, TX (US); Kathryn Anne Newth, Round Rock, TX (US)

(73) Assignee: Healthmark LLC, Austin, TX (US)

( * ) Notice: Subject to any disclaimer, the term of this patent is extended or adjusted under 35 U.S.C. 154(b) by 132 days.

(21) Appl. No.: 11/139,959

(22) Filed: May 27, 2005

(65) Prior Publication Data

US 2005/0282142 A1 Dec. 22, 2005

Related U.S. Application Data

(60) Provisional application No. 60/576,830, filed on Jun. 3, 2004, provisional application No. 60/581,848, filed on Jun. 22, 2004.

(51) Int. Cl.
*G08B 21/00* (2006.01)

(52) U.S. Cl. .................................... 340/540; 340/573.1

(58) Field of Classification Search ................ 340/540, 340/573.1; 434/236, 238
See application file for complete search history.

(56) References Cited

U.S. PATENT DOCUMENTS 5,771,925 A 6/1998 Lewandowski
6,211,788 B1 * 4/2001 Lynn et al. .............. 340/573.1
6,832,916 B2 * 12/2004 Collopy ...................... 434/236

* cited by examiner

*Primary Examiner*—Jeffery Hofsass
*Assistant Examiner*—Shirley Lu

(57) ABSTRACT

A method and apparatus are disclosed involving a soap dispenser base for helping assure the washing of a person's hands. Pressure exerted on a soap dispenser in contact with the soap dispenser base activates a timing means coupled with the base which gives information to the soap dispenser user on the correct duration of time to wash their hands. The base may also include a signal means which helps verify to other parties that the soap dispenser has in fact been utilized. Additionally, the soap dispenser base product may also contain marking mechanisms which are designed to be placed on a variety of different styles of soap dispensers. The marking mechanisms contain an easily identifiable substance which can only be removed by effective hand washing.

6 Claims, 2 Drawing Sheets

82
83
14
10
FORCE
FORCE
71
72
78

SOAP DISPENSER BASE SYSTEM

CROSS REFERENCE TO RELATED APPLICATIONS

This application claims priority from the following two applications: (1) Application No. 60/576,830 filed Jun. 3, 2004 by John Lynn, et al and entitled "Soap Dispenser Base that Helps Assure Sanitation; and (2) Application No. 60/581,848 filed Jun. 22, 2004 by John Lynn, et al and entitled "Soap Dispenser Base System".

TECHNICAL FIELD OF THE INVENTION

The present invention relates in general to the field of maintaining sanitation using an apparatus sized to act as a base for almost any standard soap dispenser and a system including the base. The base gives information concerning the duration of effective hand washing when the soap dispenser is put into contact with the base and then utilized. The base may also be used with a system including marking means which can be detachably attached to a standard soap dispenser and which resulting mark is removable by hand washing of the type desired to help assure sanitary hands.

BACKGROUND OF THE INVENTION

In a variety of different fields, businesses and residences, there is a great desire that people wash their hands more effectively and more frequently. The US Center for Disease Control has stated that "The most important thing you can do to keep from getting sick is to wash your hands". And yet, many people, through lack of knowledge, poor habits or simple negligence either do not wash their hands frequently enough or effectively enough.

An example of a specific need for assuring sanitized hands is the food services industry. It has been known for many decades that food preparers, servers and so forth should clean and sanitize their hands prior to handling food to be served. This need is self-evident when food service employees enter restrooms. Bacteria (such as *E-coli*, those found in fecal matter, uncooked foods etc) in restrooms are well known health hazards and without proper cleaning/sanitization of the hands of restaurant employees, can be transmitted to unknowing customers. These and other concerns also suggest a need for sanitizing hands in private residences, especially in homes with children.

Currently, food service concerns, parents as well as health industry participants are trying to address the problem with rules and regulations concerning hand washing. For instance, in many food service establishments there are signs which state roughly "Employees must wash their hands before leaving." Methods which require adherence to a rule or policy by human beings with little or no reinforcement or monitoring are typically insufficient to maximize compliance. Importantly, such rules and regulations do little or nothing to assure that even if hand washing is done, it is done correctly (e.g. for a long enough period of time or energetically enough to kill the germs).

Presently there are both patented and un-patented systems intended to address the problem of insufficient hand washing. These systems are typically very complex and, accordingly, prohibitively expensive. U.S. Pat. No. 5,670,945, for example, discloses a complex system that has a sanitizing basin with moisture proof switches inside the sanitizing basin and proximity detectors. A person must insert both hands simultaneously into the sanitizing basin in order to initiate the desired output signal. U.S. Pat. Nos. 6,426,701; 5,945,910; 5,812,059; 5,202,666; 4,896,144; 3,967,478; 5,610,589; 4,688,585 and 5,199,188 and U.S. patent applications 20030030562; 20030197122; 20030019536; and 20040001009 all involve relatively complex systems containing such things as complex electronics, location sensors; pumps and so forth (often mixed together in complex attempts to require hand washing). In summary, the presently available systems are typically expensive, complex to install, difficult to maintain and it can be difficult to train users in their operation.

One simpler concept is disclosed in U.S. Pat. Nos. 6,031,461; 6,147,607 and 6,211,788. These patents disclose a method and apparatus to assure the washing of hands by marking a person's hand with an easily identifiable substance which requires the washing of the hands when a person does something where washing of the hands would be desirable. These prior art patents cover broadly the concept of marking of the hands in order to achieve washing of the hands.

U.S. Pat. No. 5,771,925 discloses a soap dispenser that has timing means when it is utilized, but it does not include a base that is sized to be usable with a great variety of different soap dispensers and it does not include the additional hygiene assurance method of the hand marking system disclosed in the subject invention.

SUMMARY OF THE INVENTION

There is a need for a simple, inexpensive method to help assure that people wash their hands frequently and effectively. Especially desirable is a system that is simple and inexpensive enough to allow it to be put into almost any setting without costly retrofitting bathrooms or hand washing areas.

In accordance with the present invention, a method and apparatus are disclosed for helping to assure the washing of hands that provide advantages over prior sanitization assurance schemes.

According to one aspect of the present invention, a method for helping to assure washing of hands preferably involves a soap dispenser base (sized to be usable with multiple different soap dispensers) which informs a person of how long they should wash their hands. In another aspect of the current invention, the use of the soap dispenser base could also be accompanied with a concurrent (or roughly concurrent) signal that the soap dispenser has been used which acts as an additional coercion for a person to utilize the soap dispenser. According to another aspect of the present invention, a method for helping to assure washing of hands preferably also involves a system of applying an easily identifiable substance to the hand of a person using a soap dispenser which is in contact with the base of the subject invention. The easily identifiable substance can be removed from the hand only by washing with a cleansing medium for a period of time sufficient to help assure sanitary hands. The design and choice of the easily identifiable substance can, accordingly, in conjunction with the hand wash timing means of the soap dispenser base, help assure the type and kind of hand washing desired. In an exemplary embodiment, detachable marking mechanisms are sold with the base system of the subject invention and are intended to be detachably coupled to any soap dispenser which then sits on or is attached to the base. The marking mechanism is likewise coupled to (or integral with) the easily identifiable substance, and a hand of a person is marked with the easily identifiable substance when the soap dispenser is utilized.

The person then is required to wash their hands effectively or bear the mark which makes it obvious that their hands have not been washed effectively since receiving the mark.

In accordance with the teachings of the present invention, effective hand washing is not contingent upon incorporation of complicated devices into existing fixtures in a bathroom, kitchen or hospital room (e.g. wash basin, faucets, door knobs, gate handles or toilet flushing mechanisms). As a result, the soap dispenser base system which helps prompt the correct duration of hand washing incorporating the teachings of the present invention provides cost savings advantages over many existing technologies and avoids more expensive mechanisms and/or retrofitting.

Because it may be possible to bypass or not utilize a soap dispenser which is sitting on a base of the subject invention, it may be desirable to have a means of coercing desired persons (employees or children) to utilize the soap dispenser. In accordance with the teachings of the present invention, a means to remind and/or urge persons to use the soap dispenser (along with the hand washing timing information (prompt/reminder) and marking means which can be detachably attached to the base) may be implemented through the use of a signal means activated substantially concurrently with the utilization of the soap dispenser by a person. The signal means can produce audible, visual, olfactory, tactile, kinetic or other signal forms. The signal means may be designed to make failure to use the subject soap dispenser obvious.

For simplicity and cost reasons, the timing means (e.g. information delivered on sufficient hand wash duration) and the signal means may be one in the same. For example, the timing means (e.g. beeps at the start and/or finish of the desired hand washing duration, typically 15-30 seconds) may be loud enough to also alert interested non-washing parties near, or even outside of, the immediate area (e.g. employers or parents) that the soap dispenser was actually used.

In the exemplary mode where a signal means is used to coerce use of the soap dispenser base, people become accustomed to hearing or seeing the signal means. As users develop their hand washing routine, failure to use the soap dispenser base which activates the signal means becomes obvious to both the intended user (e.g. child in his bathroom, the restaurant employee in the restroom or doctor or nurse in a patient's room) and others who expect to hear or see the signal (e.g. parent, restaurant customer or management, or a patient in a medical facility). The signal from the soap dispenser base may also have a delayed response so that, for example, a restaurant employee in a restroom who may otherwise try to bypass the apparatus because they believe no one is close enough to hear the signal will hesitate to do so because of the time delay and the fact that someone may enter the vicinity of use during the interim period. The result being that such entering person (possibly the user's boss or a child's parent) would not hear the signal which would be expected should the soap dispenser base have been actually used. Accordingly, for example, a restaurant employee in a rest room may be less likely to try and bypass the soap dispenser with the subject base if the signal is designed to activate at some delay to his use of the apparatus, since he isn't sure who may enter the restroom in the interim period. The delayed signal may also be used as an additional indication of how long the person should wash their hands (e.g. a beep or sound that happens 20-30 seconds after the soap is dispensed).

The signal or lack thereof, may begin to have a Pavlovian response. Accordingly, transforming an essentially voluntary action into almost a reflexive action. As a result, use of the soap dispenser with the subject base and accompanying signal preferably may ultimately serve as a sign of cleanliness and hygiene that will both (1) coerce use by desired users; and (2) allow monitoring and give comfort to others interested in hand washing (e.g. restaurant customers/management, hospital patients and parents of children).

The signal means may also act as both a reminder and as a positive reinforcement. It is possible that children in households would be praised each time they "ring the bell" (or play a favorite song which could be used as the audible signal and hand wash timing means) when using the soap dispenser with the subject base. For variety and enjoyment, there could be a series of different songs or noises that could be chosen from a menu. The soap dispenser and subject base may be placed proximate to a bathroom sink. It is possible that the soap dispenser base and/or marking mechanisms become a game for a child that helps teach them how long to wash their hands and also coerces use of the soap dispenser because of the signal means which they understand their parents can hear in another room. Many younger children like to be marked with stamp pads and accordingly the marking of the hand with the easily identifiable substance also becomes part of the game (also training) of using the soap dispenser base and markers of the subject invention. In essence, it takes a boring, mundane task (hand washing) and makes it more fun since there is feedback to the child concerning how they are doing.

Another means of helping to coerce or urge use of a soap dispenser with the subject base could be an information recording means which records and/or displays information relating to use of the soap dispenser/base. Examples of information that might be displayed are a frequency of use of the soap dispenser base (with or without the detachably attached marking means on the soap dispenser) and/or particular times it was used. In this manner, for example, a parent could, at the end of a day, check how often a child had used the soap dispenser/base and the timing of its use. It could be used to see trends in hand washing and reward positive behavior and attempt to change insufficient hand washing. This information would allow a parent (or employer) to monitor hand washing protocol.

The present invention may be used in any situation where it is desirable that a person washes their hands. Medical studies show that washing hands numerous times a day dramatically decreases illnesses. Accordingly the invention may be used in various places where a soap dispenser may be desired. In addition to traditional liquid soap dispensers (e.g. Soft Soap from Colgate Palmolive) which require a sink nearby to remove the soap this invention can also be used with alcohol based, or other antibiotic cleansers such as Purell from GOJO, which do not require a nearby sink for use, since they do not require rinsing with water.

It is a technical advantage of this invention that it turns essentially any standard soap dispenser into an apparatus which gives information to persons using the soap dispenser as to how long they should wash their hands. It is a further technical advantage of this invention of assuring that individuals wash their hands well by marking the hands with an easily identifiable substance when they use a soap dispenser. The easily identifiable substance is preferably designed to require the specific type and duration of hand washing desired for the end use (e.g. soap and water in a household and an alcohol based cleanser in medical facility). It is another technical advantage of the present invention that it is an extremely simple and inexpensive system and method which can be easily placed in any entrance, exit or other area of a home or business without changing existing fixtures or retrofitting and even allows the use of a person's favorite soap dispenser. It is another technical advantage of the present invention that use of the soap dispenser/base is coerced through either use of the signal means or use of the recording means.

Other technical advantages of the present invention should be apparent from the drawings and specification.

BRIEF DESCRIPTION OF THE DRAWINGS

A more complete and thorough understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
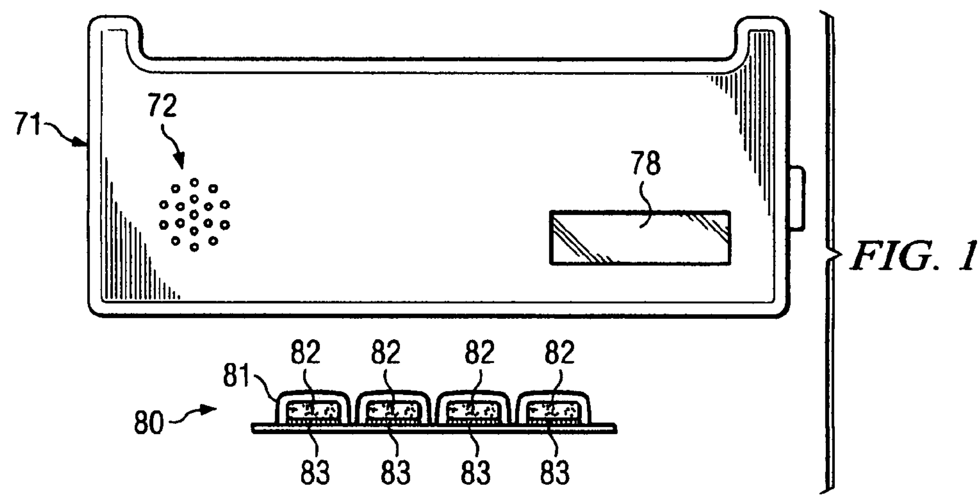
FIG. 1 is a side view of one embodiment of the system of the subject invention. At the top of the figure is an exterior side view of the soap dispenser base and below the base are the absorbent pads which may make up part of the total hygiene system.

FIG. 1 shows base 71 of the subject invention (intended to be usable with a multitude of different soap dispensers). Base 71 also contains speaker holes 72 and display window 78 (discussed more below). FIG. 1 also shows an exemplary example of an absorbent pad package 80 which contains a series of separate absorbent pads 82 which are coupled with detachable attachment means 83. The absorbent pads 82 contain an easily identifiable substance (not expressly shown since they may be integral with pad 82) which are intended to mark a person's hand and are designed to be detachably attached to the area of any standard soap dispenser where a person pumps the soap dispenser to dispense the liquid soap. To keep the easily identifiable substance on absorbent pad 82 from drying out prior to it being placed on the soap dispenser, absorbent pad package 80 has plastic cover 81 (e.g. a blister pack) which keeps the absorbent pads from being exposed to the drying effects of air on the easily identifiable substance.

Figure 2:
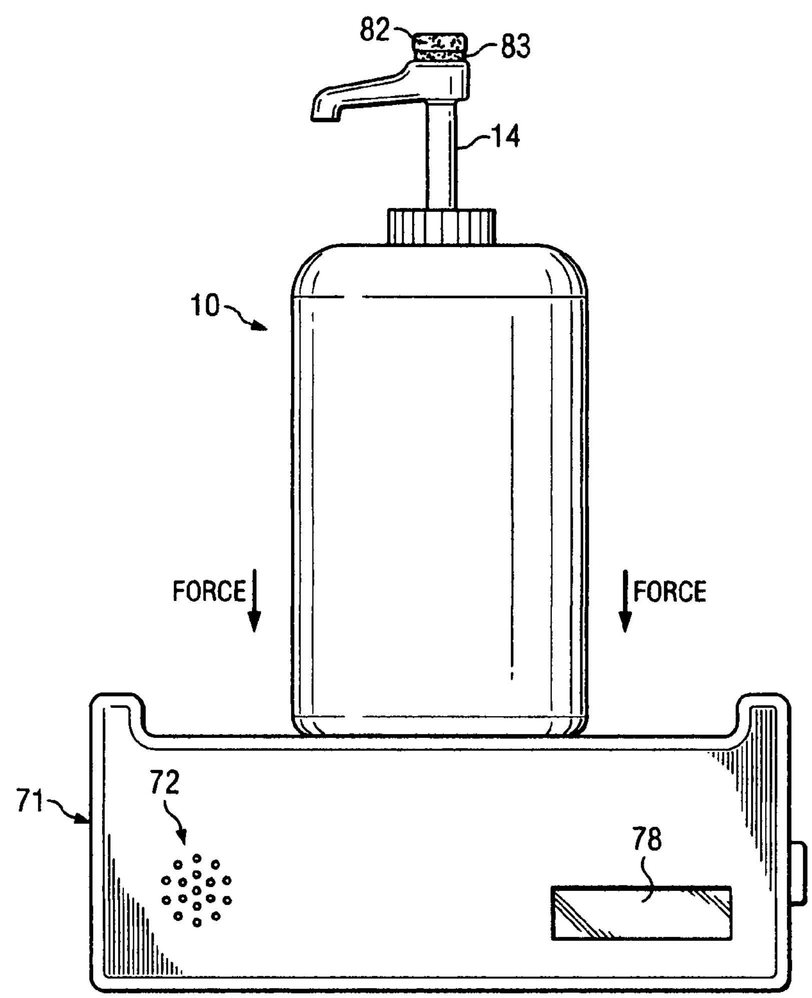
FIG. 2 is an exterior side view of one embodiment of the base of the subject invention with a soap dispenser sitting on top of the base, according to teachings of the present invention.

FIG. 2 is an exterior side view of one embodiment of a soap dispenser base which also shows the possible positioning of any standard soap dispenser (not necessarily part of this invention) sitting on top of the base which is the subject of this invention. In the embodiment of FIG. 1, any of a large number of different types of liquid soap dispensers are represented by standard soap dispenser 10 which has discharge pipe 14. Soap dispenser 10 sits unattached (or detachably attached) upon base 71 which is sized to accept numerous different size soap dispensers. Soap dispenser 10 (like most standard liquid soap dispensers), has discharge pipe 14 which is depressed or pushed down to pump/force the liquid soap out of the soap dispenser and on to a person's hand. FIG. 2, also shows an example where at least one absorbent pad 82 has been separated from absorbent pad package 80 and attached by detachable attachment means 83 to the top discharge pipe 14 on the spot where a person depresses discharge pipe 14 to pump out the liquid soap in dispenser 10. Depending upon the size of the pump area where a person depresses a soap dispenser and the size of absorbent pads 82, it may require more than one absorbent pad 82 (see FIG. 3 for an example where two pads were used) to be attached to the soap dispenser pumping area to be sure that a person is marked with the easily identifiable substance when they use the soap dispenser. Multiple pads may be necessary especially in instances where absorbent pad 82 is relatively small when compared with the surface of the soap dispenser intended to be pumped by a person's hand. It may be desirable to put various size pads 82 in the system of the subject invention to assure that any pumping mechanism may be adequately covered.

Alternatively, it is possible to put a number of small pads in the package which fit smaller pumping areas but this potentially requires the use of more than one pad on pumping areas which have a larger surface area available for a person's hand to pump out the cleanser.

In other soap dispensers normally used in commercial areas (not expressly shown but well known in the art), the discharge pipe is not depressed to pump out the liquid but instead there is another pumping actuator (e.g. a button, lever etc) which is pushed down or pulled toward a person, in order pump out the liquid soap. This invention relates not to the particular type of soap dispenser to be placed on a base but instead to the base itself. So long as the soap dispenser requires a person to exert pressure to force out the liquid soap, any such soap dispenser will be usable with the subject invention and their use would fall under the scope and concept of this invention.

The downward force on absorbent pad 82 and discharge pipe 14 also results in a downward force on the entire soap dispenser 10 which in turns exerts a downward force on base 71 (since dispenser 10 is sitting on the top surface of base 71). As shown below in FIG. 3, this downward force on base 71, results in activation of a timing means and also possibly a signal means and a recording means (in addition to the marking of the hand with an easily identifiable substance by absorbent pad 82). The timing and/or signal means would be audible through speaker holes 72 in base 71 and the output of the recording means may be viewed on display window 78.

Soap dispenser base 71 is preferably designed to sit substantially flat on a surface such as a table, sink or counter. Base 71 may also be configured (not expressly shown) to mount on a wall or other vertical surface. For vertically mounted bases and soap dispensers the pressure exerted to force out the liquid soap may not be necessarily downwards but the concept of this invention still works. For example there could horizontal pressure on a button with the discharge pipe on the bottom of the dispenser as is found in many commercial soap dispensers in public bathrooms. This horizontal pressure could also be used to activate the signal/timing means described herein and mark the hand with the easily identifiable substance.

The shape of soap dispenser base 71 may also be varied. For example for use with children, it may be desirable to make base 71 in the shape of an animal, vehicle, toy or action hero. In this case, if there is an audible signal or timing device, it may be desirable to match the audible signal of the device with the shape of the container (e.g. having a frog shaped cover making a croaking noise as the signal). The most important aspect of the shape of base 71, is that the upper surface be sized such that almost any soap can be placed flatly upon it. It may be that a 3-6 inch diameter top surface is sufficient to accept the vast majority of standard liquid soap dispensers on the market. However, for space reasons, it may be desirable to shrink the size of the base (3-4 inches in diameter) to handle many but not all standard soap dispensers. For extremely popular soap dispensers the base may be designed to fit snugly with the particular dispenser expected to be used. In other cases, it may be desirable to put some type of detachable attachment means (e.g. velcro, two sided tape) on the bottom of the soap dispenser and/or top surface of the base to keep them in contact. It is possible that on bases with horizontal top surfaces that gravity alone is sufficient for use of the base with a desired soap dispenser.

Figure 4:
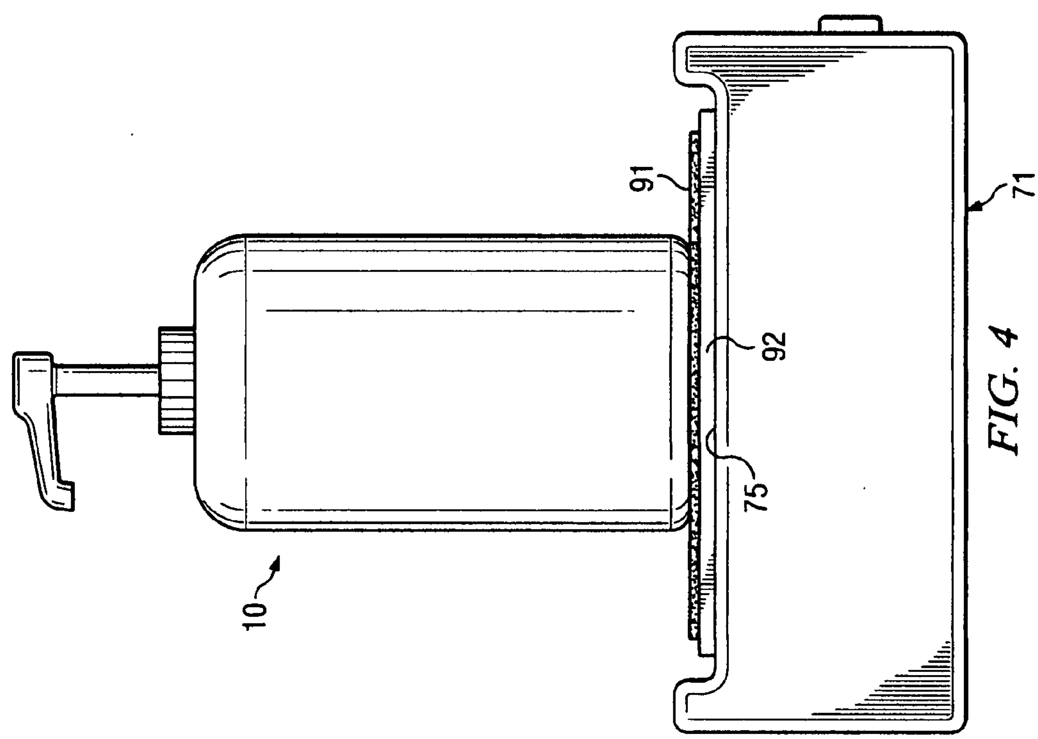
FIG. 4 is a side view of soap dispenser base of the subject invention, which also includes a platform or plate which is attachable to the bottom of most soap dispensers and can snapped or slid onto the top of the base.

FIG. 4, shows an exemplary embodiment of the current invention which has a plate/platform 92 which is not integral with base 71 but instead is designed to be detachably attached to base 71 and also any standard soap dispenser. Plate/platform 92 is sized such and designed such that detachably attaches to the bottom of essentially any soap dispenser using detachable attachment means 91 (e.g. by velcro, an adhesive, double sided tape etc). Because of the uneven bottoms of some commercially available soap dispensers (e.g. both Soft Soap and Dial dispensers have a concave indentation on their bottom surface) it may be desirable that attachment means 91 (e.g. an adhesive or tape) be thick enough and moldable enough that it maximizes the surface area in which attachment means 91 contacts the bottom surface of soap dispenser 10.

In the exemplary example of FIG. 4, plate 92 slides into (or snaps onto) the top of base 71. It is also possible that plate 92 is detachably attached to base 71 by the same means as plate 92 is attached to a soap dispenser. Plate 92 has the further technical advantage of dispersing the downward force of both the weight of soap dispenser 10 and the pumping force on soap dispenser 10 to a larger surface area of top surface 75 of base 71. This dispersion of the downward forces from soap dispenser 10 over a larger surface area should allow for more uniform pressures on the base and therefore should make any calibration of the pressure sensors and/or calibration of the desired downward movement of top surface 75 easier to handle. (Note: FIG. 4, just as an example of different modes, does not show any absorbent pads on soap dispenser 10 since some people may choose to either not use absorbent pads 82 or may discontinue use after some training period is over).

Figure 3:
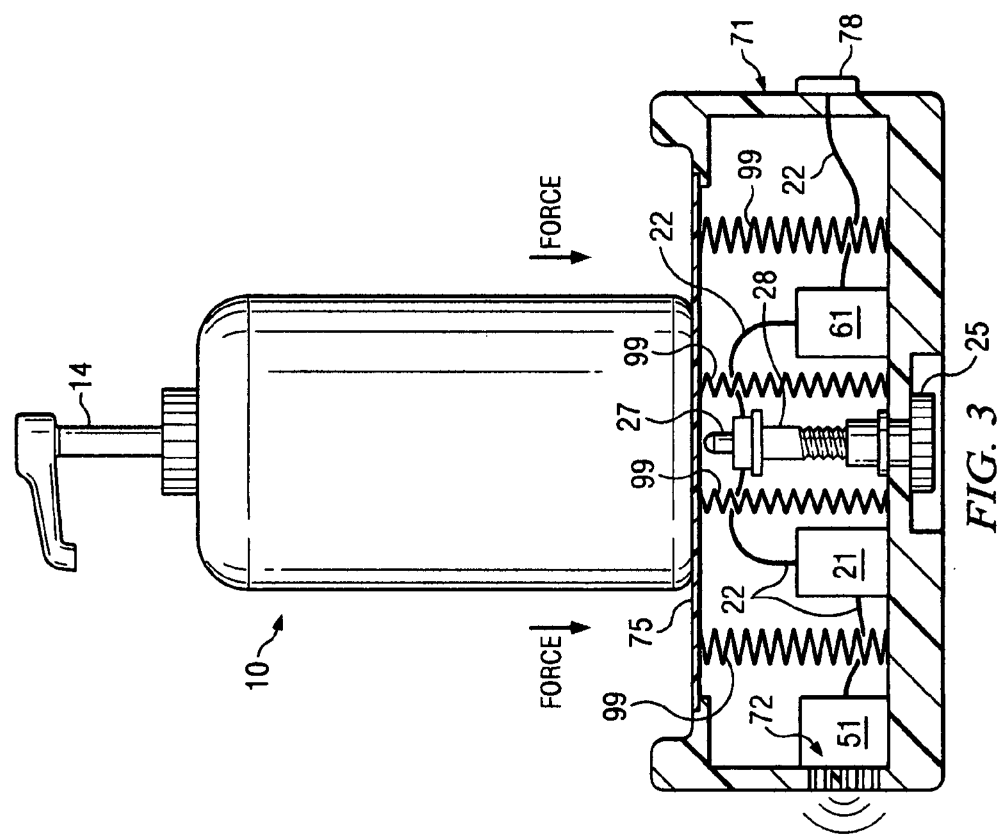
FIG. 3 is a cross-sectional view of the soap dispenser base of FIGS. 1 and 2, which shows the timing/signaling means, recording means, and pressure sensing means.

FIG. 3 is a cross-sectional view of the base of FIGS. 1 and 2 showing an exemplary configuration of the present invention. Soap dispenser 10 sits unattached (i.e. using gravity) or detachably attached to top surface 75 of base 71. (Note: soap dispenser 10 is not necessarily part of the subject invention, since it is designed to work with any of a number of commercially available soap dispensers). In this particular embodiment of the invention, top surface 75 is a flexible material (such as a thin plastic sheet or a thin metallic sheet or so forth) which will flex inward with a downward pressure on soap dispenser 10. (It is also possible, in an embodiment not expressly shown, that top surface 75 is rigid but moves up and down in relation to fixed base 71 which holds pressure sensor 27).

Positioned underneath of top surface 75 is pressure sensor/switch 27 which is activated when sufficient force is applied to top surface 75. To prevent activation of pressure sensor 27 from too little pressure on top surface 75 (e.g. the weight only of soap dispenser 10 and it's contents) there are spring(s) 99 which keep the unbiased position of top surface 75 out of contact with pressure sensor/switch 27 even when soap dispenser 10 is full of liquid soap. (Springs may not be needed in cases where top surface 75 is designed such that it flexes back into an upward position after the downward pressure from a hand utilizing dispenser 10 by pushing on discharge pipe 14 is relieved even with a full soap dispenser 10).

In order to allow base 71 to work with a number of different weight soap dispensers with varying amounts of liquid soap at different times, it is necessary that springs 99 be designed to keep top surface 75 off of pressure sensor 27 with a wide variety of different weights upon top surface 75. However, simultaneously it is necessary that springs 99 also move enough to allow top surface 75 to contact sensor 27 when a typical user depresses any soap dispenser to pump the liquid soap out of the dispenser. Because, this pumping action typically requires (or by habit people exert) much more force than is comparable to the weight of a typical soap dispenser, it is possible to find springs (or to calibrate them) such that sensor 27 is not activated unless a person pumps soap dispenser 10 to get liquid soap out.

However, because different soap dispensers have different weights and because the total weight changes as the contents of liquid soap in the dispenser is added or taken out, it may be desirable to have means to adjust the amount of pressure needed on top surface 75 to activate switch 27. In the embodiment shown in FIG. 2, this is done by placing pressure sensor 27 on adjustable platform 28 which can be lowered or raised by screwing up or down pressure dial 25. In this particular exemplary embodiment, pressure dial 25 is counter sunk into the bottom of base 71 and simply turning the threaded dial will raise or lower adjustable platform 28 so that switch 27 is activated only when the desired pressure is exerted on top surface 75. Rather than using a multitude of different potential positions for sensor 27, as is possible using screws and the pressure dial described immediately above, it may also be possible to have just two or four standard positions or pressure settings for sensor 27 (not expressly shown) which are easily changed by using various methods well known in the art (e.g. sensor supporting means with notches to achieve preset different positions, levers that raise or lower sensor 27, changes in the sensitivity of the pressure sensor and so forth). In addition, it may also be possible to change the tension in spring(s) 99 by methods well known in the art.

Pressure sensor/switch 27 is in communication with a timing/signal means and recording means. In the particular embodiment shown in FIG. 3, the signal means and timing means are incorporated in the same device (i.e. the communication of the necessary hand washing duration is done loudly enough that it also serves as signal of the use of base 71). It may be desirable to utilize different components for the signal means and timing means as opposed to combining them in one component. If signal means are not desired (i.e. there is no policing/coercion desired by the end user), the volume of the output from the timing means may be lowered such that the user is the only person who necessarily hears the timing prompts (e.g. a soft beep or buzz at the end of the desired hand washing duration as opposed to a buzz, beep or song loud enough to be heard outside of the restroom). Means to control the volume coming out of the signal means or timing means are well known in the art.

In sum, pressure sensor/switch 27 is activated/triggered when soap dispenser 10 is forced downward by a person pushing down on discharge pipe 14 (from FIG. 3). This preferably occurs every time that soap dispenser 10 is utilized. It is possible to configure base 71 output in a variety of ways in reaction to the activation of switch 27, depending on the desires of the end user. For example, among other configurations, it could be configured as follows: (1) a signal/timing means is included but no recording means is included; (2) a recording means is included but no signal/timing means; (3) both the recording means and signal/timing means are included but either or both may be deactivated or activated as desired by the end user using on/off buttons or switches; and (4) the volume of the timing means is variable such that at high volume it acts as a signal of use or at low volumes it is solely used to inform the soap dispenser user of the correct amount of time to wash his hands. Also as a further option to a user of the present invention it is possible that he may (or may not) utilize absorbent pads 82 such that a person using the soap dispenser is either marked or not marked with the easily identifiable substance according to the user's desire (or the desire of their parents and/or management).

This flexibility in the use of the various options for the base system set forth in the subject invention, allows for varied configurations during a potential training period. For example when training one's children (or employees) about how to wash their hands, it may be desired to mark a trainee's hand with the easily identifiable substance for some period of time in order to graphically show desired duration and minimum hand washing energy/vigor (note: the easily identifiable substance only comes off with a minimum duration and some minimum amount of hand washing vigor/energy). After the child or employee has demonstrated efficacious hand washing, the parent or manager may decide to discontinue (i.e. remove absorbent pad(s) 82 from the soap dispenser) hand marking and use the timing means and/or signal means to continue the coercion/training of effective hand washing.

Base 71 preferably comprises signaling/timing means 51, recording means 61 and power supply 21 (in order to keep costs down the recording means may be left out since the cost of memory, processors etc may increase final product costs). For less expensive versions of the base, it may be preferable to leave out recording means 61 and display window 78. Also preferably included is pressure sensor/switch 27 which preferably allows power to flow from power supply 21 to signal/timing means 51 and recording means 61. Accordingly, switch 27 is preferably operable to selectively couple signaling/timing means 51 and recording means 61 to power supply 21 via one or more wires 22 or other electrical conduits. In the exemplary mode described herein, pressure sensor/switch 27 is activated by contact with top surface 75 as force is applied to soap dispenser 10 through discharge pipe 14. As discharge pipe 14 is depressed to dispense liquid soap, top surface 75 flexes or bends (or if it is rigid, moves up and down in respect to sensor 27) to contact switch 27 and activates the signal/timing mechanism and/or recording means. Pressure sensor/switch 27 may be implemented using a variety of technologies including but not limited to contact switches, micro-electro-mechanical switches, pushbutton, toggle, slide, as well as other switches.

Timing/signaling means 51 can be any of a large number of such devices well known in the art and can include anything from integrated circuits to mechanical timers that ring a bell or some other mechanical noise maker. In FIG. 3, it shows the timing means and signal means being integrated into the same component (and this may be desirable for cost reasons) but it also possible that they are separate components and that in certain embodiments of this invention either one or the other may not be present (i.e. signal of use but no timing or alternatively, timing of hand washing but no signaling of use). In the case of mechanical timers/signal means, no power source and perhaps no pressure sensor/switch is necessary since the depression of top surface 75 provides the energy to activate and run the timer/signal mechanism. In fact, such mechanical timing/signaling may be desirable since in some cases it takes a number of priming pushes on a soap dispenser to actually get the liquid soap out of the dispenser (this resetting can also be accomplished with electronic timers, well known in the art, which automatically reset themselves as they are activated repeatedly over short periods of time). In this case the mechanical and/or electronic timer/signal means would keep resetting itself until the user was actually finished pumping the soap dispenser.

It is also possible to add display window 78 which displays information recorded by recording means 61. Recording means 61 is preferably maintained in communication with display window 78 with wires 22. Display window 78 preferably displays on the exterior of base 71 information recorded by recording means 61. This information, for example, may be things such as how many times the apparatus was activated during a particular period of time and the times of the activation, as well as other characteristics. Signal/timing means 51 and recording means 61 are preferably activated when switch 27 is activated. Further, pressure sensor/switch 27 is preferably activated when discharge pipe 14 is pushed downward.

The normal unbiased position of top surface 75 is up. Accordingly, top surface 75 is preferably not maintained in contact with switch 27. And accordingly signal/timing means 51 and recording means 61 are preferably not activated and no sound or signal is produced by signal means 51 nor is any activity recorded by recording means 61 in such circumstances. The use of pressure sensors, switches, power supplies and signal means capable of generating sounds are known in the art and as such various modifications may be made to the exemplary embodiment discussed here in without departing from the spirit of the teachings of the present disclosure.

In an alternate embodiment of the invention (not expressly shown) the signal means may be located remote from the marking mechanism. This configuration may be desirable where a person monitoring hand washing (e.g. restaurant manager or parent of a young child) desires to have the signal presented at a location other than where the soap dispenser base is placed. For example, a parent may not be able to detect the signal from the apparatus if it goes off only in the child's bathroom area (it may be desirable to have a volume control on the signal means—local or remote—so that parents/employees can change the volume on the signal to their needs). In such case the parent may desire to have one or more remote signal means in another area of the house such as the kitchen or living room. This may be done by hardwiring the signal means to a remote location or using one or more wireless technologies. In general, remote communication my be facilitated by placing one or more transmitters/transceivers in communication with one or more receivers/transceivers. Examples of wireless technology capable of communicating in accordance with the teachings of the present invention include without limitation, IEEE 802.11× technologies, Bluetooth, GSM (Global system for mobile communications) 3GSM, CDMA, TDMA, infrared, radio spectrum, as well as others.

Persons skilled in the art may realize that recording means 61 may be implemented using a variety of different technologies, including without limitation, one or more of the following: IC, ASIC, EEPROM, memory and processor combinations, mechanical counters, as well as others. could be done a number of different ways. With integrated circuits getting cheaper and cheaper as Moore's Law drives down semiconductor costs, it is possible that a great of variety of different types of information may be cheaply collected, stored and displayed. In fact in a business scenario with many users of the invention, it may be desirable to track the actions of specific employees and their use of the soap dispenser base by having the employees wear electronic badges (e.g. RFID devices) or using biometrics which allow recording means 61 to differentiate the actions of different persons using the soap dispenser. The timing of the use of the present invention may also be compared with the timing of the use of water faucets or other devices used in hygiene processes.

In another embodiment of the invention, the soap dispenser base disclosed herein can be used redundantly with a back up electronic detection system to determine whether a person has entered a restroom. One such electronic system using name tags is disclosed in U.S. Pat. No. 5,610,589.

In a further embodiment of the invention, the base could be part of dual product package which also includes package of attachable and detachable marking devices 80 as shown in FIG. 1. Package 80 contains a multitude of absorbent pads 82 (or other types of marking devices) which are designed to be placed on the soap dispenser at the spot where a hand pushes down to pump out the liquid soap. They are roughly thumb nail sized circular, square or oblong shaped absorbent pads which contain an easily identifiable substance. They are size (½ inch to 1 inch in diameter) so that they will fit on a great variety of different soap dispenser pump mechanisms (it may be desirable to use more than one in some cases). This would allow a further means to assure effective hand washing since the marking devices contain an easily identifiable substance that is only removable with effective hand washing. Such marking devices (e.g. cartridges, absorbent pads, strips etc) and their uses are fully disclosed in U.S. Pat. No. 6,211,788 which is jointly owned and incorporated herein by reference.

In addition, the easily identifiable substance could be delivered to the skin in a variety of ways in addition to contact with absorbent pad 13. Other options include spraying, stamp pads and so forth. The present invention can provide benefits to any such marking mechanism, and the specific type of marking mechanism is relatively unimportant. What is important is that they are able to be detachably attached to a variety of different type of soap dispenser pumping mechanisms (although in certain instances for particularly popular soap dispenser brands it may be possible to design marking mechanisms particular to a certain soap dispenser, as opposed to being widely usable).

In addition, the easily identifiable substance can also be a great variety of different types of substances such as set forth in U.S. Pat. Nos. 6,031,461 and 6,211,788. These include inks, dyes, vegetable dyes, paint, stain, pigment, grease and any combination thereof. The easily identifiable substance may also be designed such that it is not easily identifiable visually, but instead is easily identifiable using other detection means such UV light, or using small metallic substances which are electronically detectable. The easily identifiable substance could be comprise even more exotic substances such as extremely tiny integrated circuits (sometimes referred to as "smart dust").

As a soap dispenser is used (i.e. a hand presses down on the pumping mechanism of the soap dispenser) a person's hand comes into contact with absorbent pad 82 which contains an easily identifiable substance. Once the easily identifiable substance is on a person's hand it is likely the person will wash his hand to remove the mark. Removing the mark from the one marked hand will typically require the use of the other unmarked hand. The result, is two clean hands.

In this particular embodiment of the invention there may be no automatic means to replenish the supply of the easily identifiable substance. As such, it may be necessary that absorbing pad 82 be removable from effluent pipe 14 and also that a new absorbing pad 82 having an easily identifiable substance be attached to pipe 14 to replace the spent one. This replacement of absorbent pad 82 may be accomplished with the use of detachable attachment means 83. In addition to absorbent pads it may be possible to use stamps or cartridges which also can be replaced as they go dry. The absorbent pad may also be kept wet with the easily identifiable substance for a longer period of time by using a reservoir of easily identifiable substance which is pumped to absorbent pad 13 as the soap dispenser is used (such small mechanical pumps used to resupply marking mechanisms are well known in the art and are used in areas such as stamp pads, printing and so forth).

It is foreseen that in such an embodiment people may buy multiple sealed packages containing absorbing pads 82 (or cartridges) saturated with an easily identifiable substance and connected to detachable attachment means 83 (which may be double sided tape (which are widely available commercially). A wide variety of absorbing materials and absorbent pads may be satisfactorily used with the present invention such as those found on commercially available stamp pads. An example of absorbent materials include without limitation, the absorbing materials set forth in U.S. Pat. No. 6,211,788.

In addition to using double sided tape as the detachable attachment means 83, there are a number of other means which may be satisfactorily used to detachably attach absorbing pad 82 to the top of pipe 14 that will be readily apparent to those skilled in the art (e.g. a Velcro-type™ system, non-permanent adhesive glues and/or gels, etc).

It is a highly desirable advantage of this invention that the easily identifiable substance can be chosen or designed such that the desired type of hand washing is necessitated, once applied. For example, the easily identifiable substance may be designed such that it can only be removed by washing it off with a cleansing medium (e.g. liquid soap) and hot or warm water for a sufficient period of time, thereby maximizing sanitation of a person's hands. A commercially available easily identifiable substance is found in "Care Bears Lite Up Stampers" from Rose Art, Inc. In a cleansing experiment, this Care Bear easily identifiable substance came off very slowly (over a minute) with water only, but came off in a desirable 15-20 seconds with soap and warm water. When applied using the Care Bear Light Up stamp, it was further observed that the Rose Art easily identifiable substance dried almost immediately upon application to a hand and therefore smearing or staining other articles was unlikely.

In a highly sanitary area such as a hospital, nursing home or doctors office, the easily identifiable substance may be designed such that the only effective cleansing medium is a highly effective anti-germ or anti-bacterial substance (e.g. an alcohol based cleanser).

Although the present invention has been described with respect to a specific preferred embodiment thereof, various changes and modifications may be suggested to one skilled in the art and it is intended that the present invention encompass such changes and modifications.

We claim:

1. An apparatus for helping to assure that people wash their hands more effectively, comprising a base adapted to be in contact with an independent soap dispenser whereby said base gives information on effective hand washing duration when pressure is exerted on the soap dispenser in contact with the base.

2. The apparatus of claim 1, in which the base has a top surface which is sized so that a number of different soap dispensers may be placed upon the top surface.

3. The apparatus of claim 2 in which the top surface further comprises an attachment mechanism which allows a variety of different styles and sizes of soap dispensers to be detachably attached to the top surface of the base.

4. An apparatus for helping to assure that people wash their hands more effectively, comprising a base which (1) is adapted to be in contact with an independent soap dispenser whereby said base gives information on effective hand washing duration when pressure is exerted on the soap dispenser in contact with the base; and (2) gives off a signal that the soap dispenser has been utilized.

5. A system for helping to assure that people effectively wash their hands, comprising: a base which is adapted to be in contact with an independent soap dispenser whereby said base gives information on effective hand washing duration when pressure is exerted on the soap dispenser in contact with the base; and (2) a marking mechanism which can be detachably attached to the soap dispenser and which contains an easily identifiable substance which is removable by hand washing.

6. The apparatus according to claim 1 or claim 4, wherein the base is adapted to sit freely on a horizontal surface and the soap dispenser comprises a bottle and a pump which requires downward pressure on the pump to dispense the soap.

* * * * *